United States Patent
Chen

(10) Patent No.: US 7,474,544 B2
(45) Date of Patent: Jan. 6, 2009

(54) INITIAL VOLTAGE ESTABLISHING CIRCUIT FOR A SWITCHING VOLTAGE CONVERTER

(75) Inventor: Tien-Tzu Chen, Hsinchu (TW)

(73) Assignee: Global Mixed-mode Technology Inc., Hsinchu (TW)

( * ) Notice: Subject to any disclaimer, the term of this patent is extended or adjusted under 35 U.S.C. 154(b) by 333 days.

(21) Appl. No.: 11/424,876

(22) Filed: Jun. 19, 2006

(65) Prior Publication Data

US 2007/0290658 A1    Dec. 20, 2007

(51) Int. Cl.
   *G05F 1/618*   (2006.01)
   *H02M 1/088*   (2006.01)
(52) U.S. Cl. .................... 363/49; 323/901; 323/222
(58) Field of Classification Search .............. 323/222, 323/901, 908, 284, 223; 363/49
   See application file for complete search history.

(56) References Cited

U.S. PATENT DOCUMENTS

| | | | |
|---|---|---|---|
| 4,806,842 A * | 2/1989 | Bittner | 323/222 |
| 6,188,266 B1 * | 2/2001 | Shimoda | 327/393 |
| 6,198,258 B1 * | 3/2001 | Ando et al. | 323/222 |
| 6,316,926 B1 | 11/2001 | Savo et al. | |
| 6,922,041 B2 | 7/2005 | Goder et al. | |
| 6,933,710 B2 * | 8/2005 | Shieh | 323/282 |
| 7,292,016 B2 * | 11/2007 | Wake | 323/271 |
| 7,298,117 B2 * | 11/2007 | Hasegawa et al. | 323/222 |

* cited by examiner

*Primary Examiner*—Akm E Ullah
*Assistant Examiner*—Harry Behm
(74) *Attorney, Agent, or Firm*—Winston Hsu

(57) ABSTRACT

An initial voltage establishing circuit has a current supplying circuit, a current adjusting circuit, a charge/discharge control circuit, and an oscillating signal generating circuit. The current supplying circuit provides a charge current and a discharge current. The current adjusting circuit adjusts the charge current and the discharge current. The charge/discharge control circuit selectively allows the charge current and the discharge current to flow through. The oscillating signal generating circuit employs the charge current and the discharge current to generate an initial voltage establishing signal such that a duty cycle of the initial voltage establishing signal gradually increases. The initial voltage establishing signal is applied to a switching voltage converter for establishing an initial output voltage.

6 Claims, 4 Drawing Sheets

INITIAL VOLTAGE ESTABLISHING CIRCUIT FOR A SWITCHING VOLTAGE CONVERTER

BACKGROUND OF THE INVENTION

1. Field of the Invention

The present invention relates to an initial voltage establishing circuit and, more particularly, to an initial voltage establishing circuit for being applied in a switching voltage converter.

2. Description of the Related Art

FIG. 1 is a circuit diagram showing a conventional switching voltage converter 10. The switching voltage converter 10 belongs to the step-up type, which converts a lower input voltage $V_{in}$ into a higher output voltage $V_{out}$. An inductor L is coupled between the input voltage $V_{in}$ and the switch node SN. A high-side switch SH is coupled between a switch node SN and an output terminal O, while a low-side switch SL is coupled between the switch node SN and a ground potential. Furthermore, an output capacitor $C_o$ is coupled to the output terminal O so as to filter ripples of the output voltage $V_{out}$. In the example shown in FIG. 1, the high-side switch SH is implemented by a PMOS transistor while the low-side switch SL is implemented by an NMOS transistor. A switch control circuit 11 applies a switch control signal CS to a driving circuit 12 for generating a high-side driving signal PH and a low-side driving signal PL. The high-side driving signal PH is applied to turn ON/OFF the high-side switch SH, while the low-side driving signal PL is applied to turn ON/OFF the low-side switch SL.

More specifically, the switch control circuit 11 adjusts the duty cycle of the switch control signal CS in response to the feedback of the output voltage $V_{out}$, thereby regulating the output voltage $V_{out}$ at a target value. The switch control circuit 11 has a feedback circuit 13, an error amplifier 14, a PWM comparator 15, a reference voltage generating circuit 16, and an oscillating signal generating circuit 17, coupled together as shown in the figure. When the output voltage $V_{out}$ is lower than the target value, the switch control signal CS output from the switch control circuit 11 provides a larger duty cycle to raise the output voltage $V_{out}$. When the output voltage $V_{out}$ is higher than the target value, the switch control signal CS output from the switch control circuit 11 provides a smaller duty cycle to reduce the output voltage $V_{out}$.

At the beginning of activating the switching voltage converter 10, the duty cycle of the switch control signal CS output from the switch control circuit 11 is expanded to the maximum because the output voltage $V_{out}$ at the output terminal O is at zero potential and therefore has a maximum difference from the target value. Such maximum duty cycle causes the low-side switch SL to be turned ON for a very long time, resulting in producing a huge inrush current to damage the circuit.

SUMMARY OF THE INVENTION

In view of the above-mentioned problem, an object of the present invention is to provide an initial voltage establishing circuit for establishing an initial output voltage at an output terminal of a switching voltage converter so as to prevent the switching voltage converter from being damaged by a huge inrush current at the beginning of activation.

According to one aspect of the present invention, an initial voltage establishing circuit is provided to be applied in a switching voltage converter for converting an input voltage into an output voltage. The initial establishing circuit includes: a current supplying circuit, a current adjusting circuit, a charge/discharge control circuit, and an oscillating signal generating circuit. The current supplying circuit provides a charge current and a discharge current. The current adjusting circuit adjusts the charge current and the discharge current. The charge/discharge control circuit selectively allows the charge current and the discharge current to flow through. The oscillating signal generating circuit employs the charge current and the discharge current to generate an initial voltage establishing signal such that a duty cycle of the initial voltage establishing signal gradually increases. The initial voltage establishing signal is applied to the switching voltage converter so as to establish an initial output voltage.

According to another aspect of the present invention, a switching voltage converter is provided for converting an input voltage into an output voltage. The switching voltage converter includes: a switching circuit, an initial voltage establishing circuit, a switch control circuit, and a signal selecting circuit. The switching circuit has a first switch, a second switch, and an inductor. The first switch, the second switch, and the inductor are coupled together to a switch node. The initial voltage establishing circuit generates an initial voltage establishing signal having a duty cycle which gradually increases. The switch control circuit generates a switch control signal in response to the output voltage. At the beginning of activation of the switching voltage converter, the signal selecting circuit allows the initial voltage establishing signal to be applied to the switching circuit to control the first switch and the second switch such that the output voltage rises up to a predetermined initial output voltage. After the initial output voltage rises up to the predetermined initial voltage, the signal selecting circuit allows the switch control signal to be applied to the switching circuit to control the first switch and the second switch such that the output voltage is regulated at a target value.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION OF THE PREFERRED EMBODIMENTS

The preferred embodiments according to the present invention will be described in detail with reference to the drawings.

Figure 2:
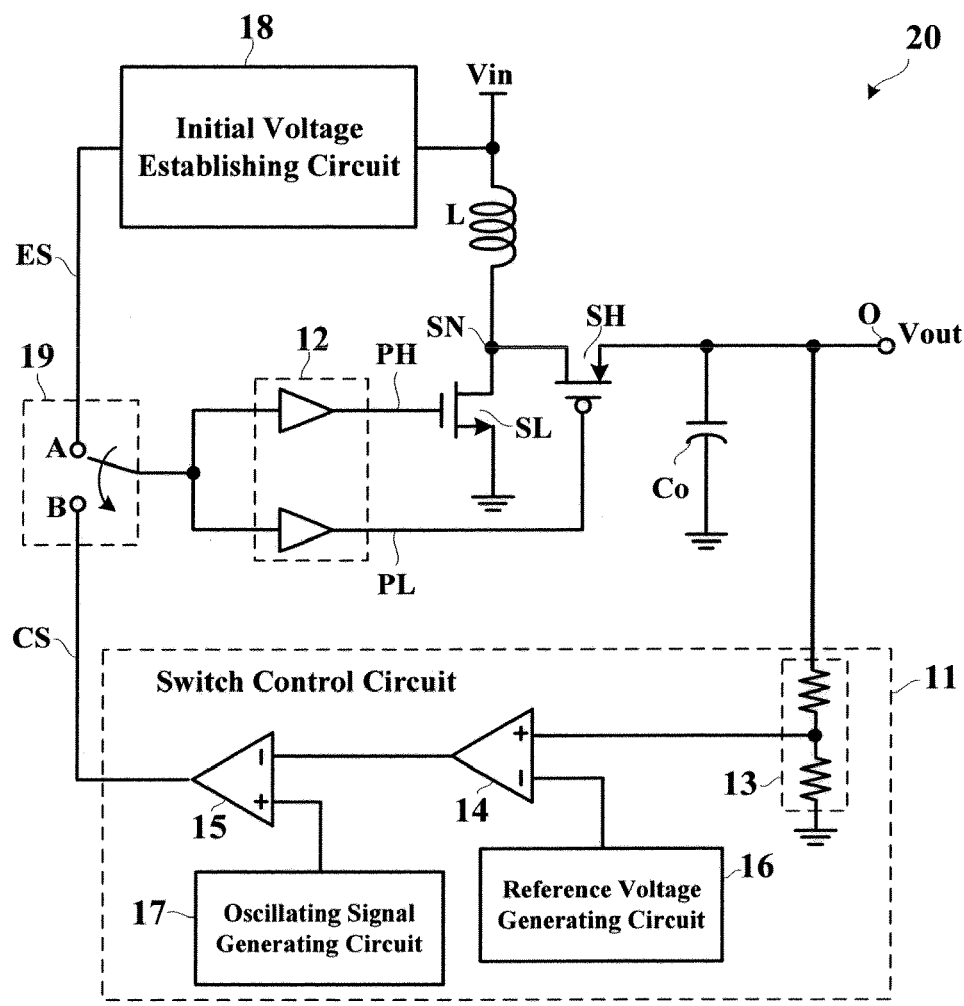
FIG. 2 is a circuit diagram showing a switching voltage converter provided with an initial voltage establishing circuit according to the present invention.

FIG. 2 is a circuit diagram showing a switching voltage converter 20 provided with an initial voltage establishing circuit 18 according to the present invention. Referring to FIG. 2, the switching voltage converter 20 belongs to the step-up type, which converts a lower input voltage $V_{in}$ into a higher output voltage $V_{out}$. An inductor L is coupled between the input voltage $V_{in}$ and the switch node SN. A high-side switch SH is coupled between a switch node SN and an output terminal O, while a low-side switch SL is coupled between the switch node SN and a ground potential. Furthermore, an output capacitor $C_o$ is coupled to the output terminal O so as to filter ripples of the output voltage $V_{out}$. In the example shown in FIG. 2, the high-side switch SH is implemented by a PMOS transistor while the low-side switch SL is implemented by an NMOS transistor.

Figure 1:
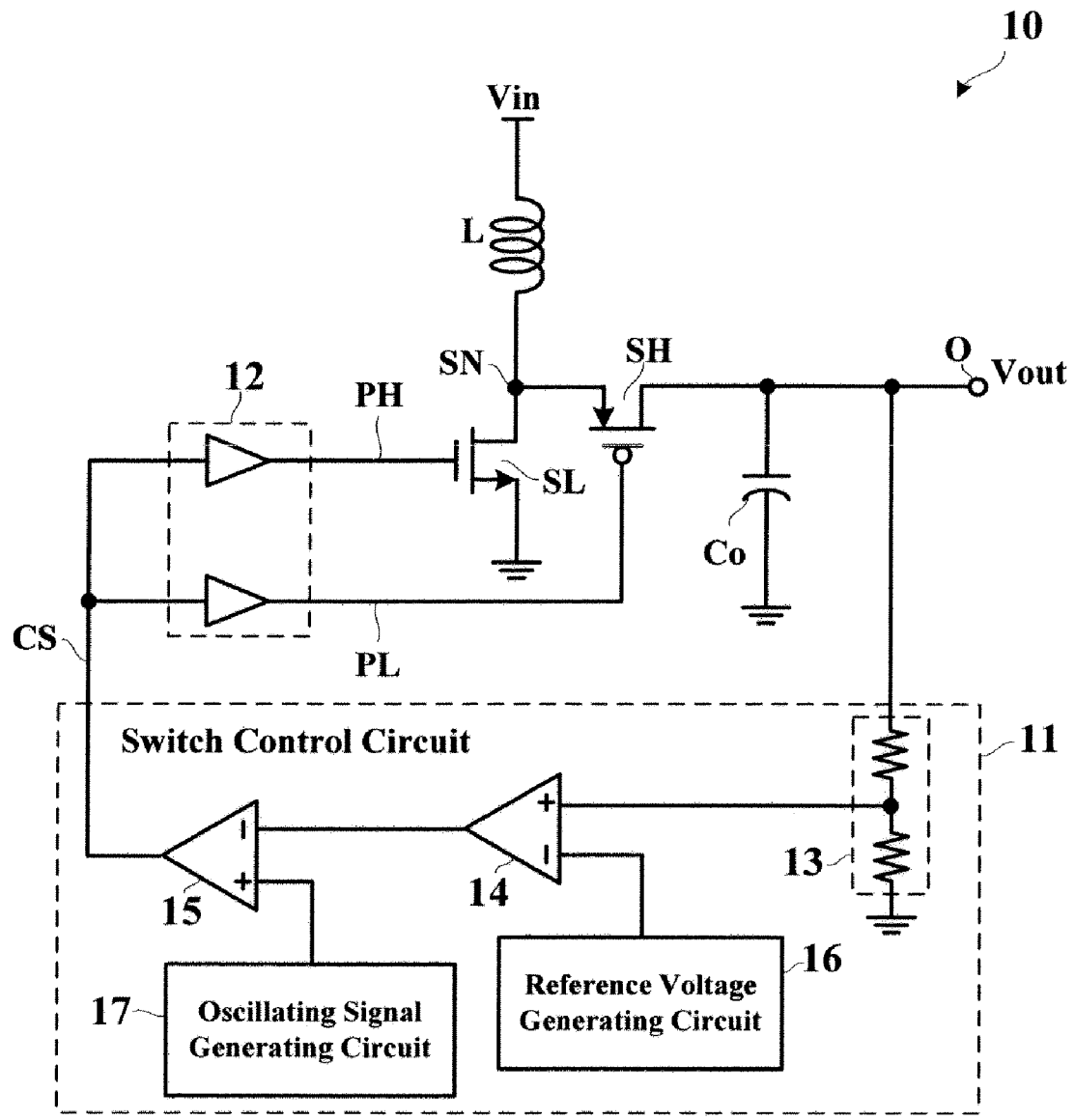
FIG. 1 is a circuit diagram showing a conventional switching voltage converter.

As described above, in the conventional switching voltage converter 10 of FIG. 1, the high-side driving signal PH and the low-side driving signal PL are generated by the driving circuit 12 on the basis of the switch control signal CS, which is generated from the switch control circuit 11.

However, in the switching voltage converter 20 of FIG. 2, the initial voltage establishing circuit 18 according to the present invention provides an initial voltage establishing signal ES. At the beginning of activating the switching voltage converter 20, the signal selecting circuit 19 allows the terminal A to be coupled to the driving circuit 12 such that the initial voltage establishing signal ES is applied to the driving circuit 12 for generating the high-side driving signal PH and the low-side driving signal PL. The initial voltage establishing signal ES is a pulse signal whose duty cycle gradually increases. More specifically, the initial voltage establishing signal ES provides a tiny duty cycle at the beginning of activation, and then the duty cycle gradually increases so as to cause the output voltage $V_{out}$ at the output terminal O to gradually rise from the zero potential to a predetermined initial output voltage. Since the initial voltage establishing signal ES provides a tiny duty cycle at the beginning of activation, the switching voltage converter 20 according to the present invention effectively prevents the huge inrush current from being generated at the activation.

After the output voltage $V_{out}$ at the output terminal O reaches the predetermined initial output voltage, the signal selecting circuit 19 allows the terminal B to be coupled to the driving circuit 12 such that the switch control signal CS is applied to the driving circuit 12 for generating the high-side driving signal PH and the low-side driving signal PL. During this phase, the switching voltage converter 20 is rendered to operate in the same way as the conventional switching voltage converter 10. In other words, the switch control circuit 11 has the feedback circuit 13, the error amplifier 14, the PWM comparator 15, the reference voltage generating circuit 16, and the oscillating signal generating circuit 17, coupled together as shown in the figure. When the output voltage $V_{out}$ is lower than the target value, the switch control signal CS output from the switch control circuit 11 provides a larger duty cycle to raise the output voltage $V_{out}$. When the output voltage $V_{out}$ is higher than the target value, the switch control signal CS output from the switch control circuit 11 provides a smaller duty cycle to reduce the output voltage $V_{out}$. Since the output voltage $V_{out}$ at the output terminal O has been raised up to the predetermined initial output voltage through the initial voltage establishing signal ES, it is unnecessary for the duty cycle of the switch control signal CS to be expanded to the maximum. Therefore, the switching voltage converter 20 according to the present invention effectively prevents the damage caused by the huge inrush current.

Figure 3:
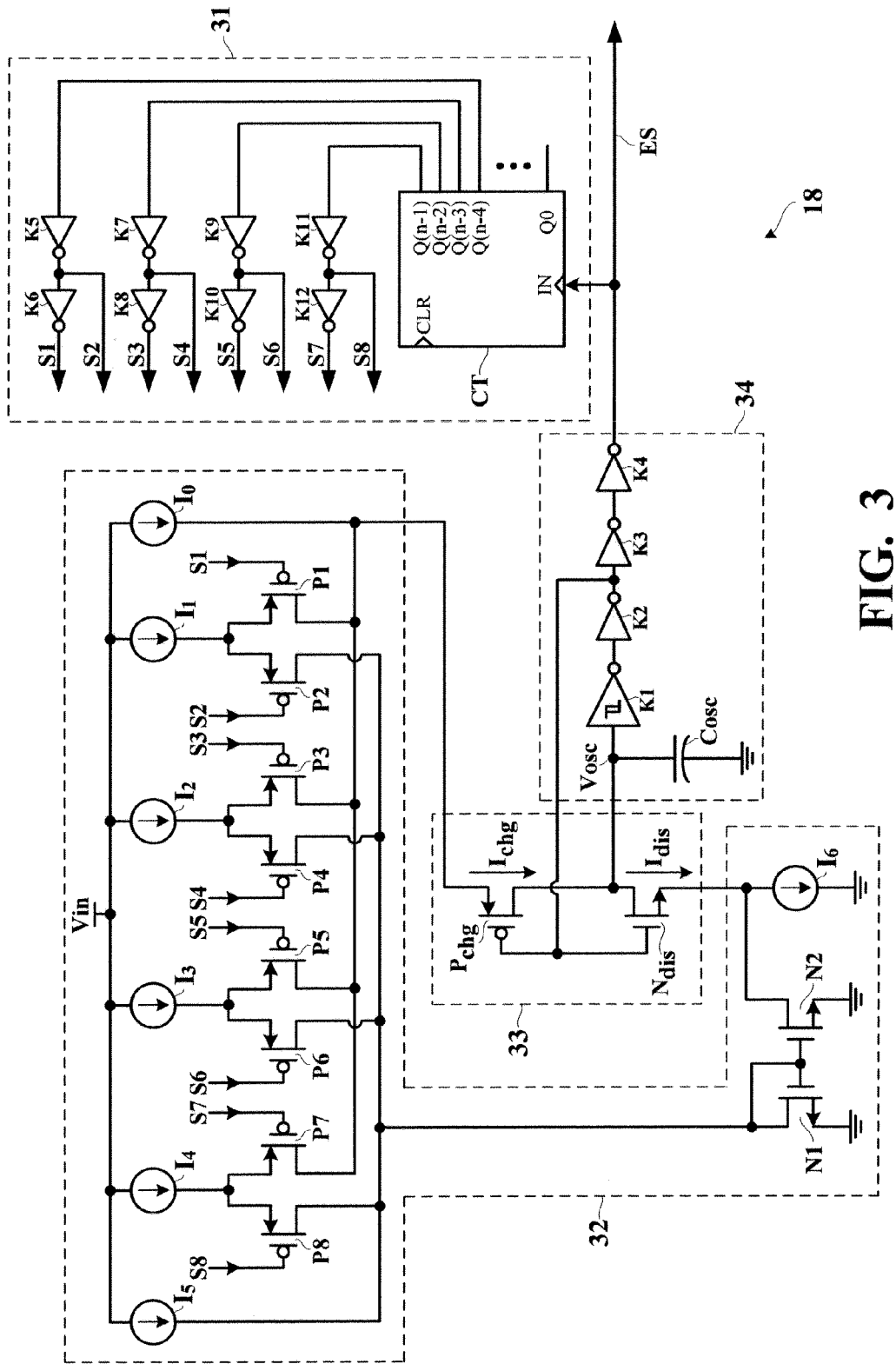
FIG. 3 is a detailed circuit diagram showing an initial voltage establishing circuit according to the present invention.

FIG. 3 is a detailed circuit diagram showing an initial voltage establishing circuit 18 according to the present invention. As shown in the figure, the initial voltage establishing circuit 18 has a current adjusting circuit 31, a current supplying circuit 32, a charge/discharge control circuit 33, and an oscillating signal generating circuit 34. Under the control of the current adjusting circuit 31, the current supplying circuit 32 provides a charge current $I_{chg}$ and a discharge current $I_{dis}$. The charge current $I_{chg}$ and the discharge current $I_{dis}$ are determined by the current adjusting circuit 31. The charge/discharge control circuit 33 selectively allows the charge current $I_{chg}$ and the discharge current $I_{dis}$ to flow through. During the charging phase, the charge/discharge control circuit 33 allows the charge current $I_{chg}$ to charge the oscillating signal generating circuit 34. During the discharging phase, the charge/discharge control circuit 33 allows the oscillating signal generating circuit 34 to be discharged through the discharge current $I_{dis}$. Through employing the charge current $I_{chg}$ and the discharge current $I_{dis}$, the oscillating signal generating circuit 34 provides the initial voltage establishing signal ES whose duty cycle is determined on the basis of the charge current $I_{chg}$ and the discharge current $I_{dis}$. In response to the initial voltage establishing signal ES, the current adjusting circuit 31 adjusts the charge current $I_{chg}$ and the discharge current $I_{dis}$ provided by the current supplying circuit 32.

The current adjusting circuit 31 primarily employs a counter CT to count a number of pulses of the initial voltage establishing signal ES, and then generates several current adjusting signals S1 to S8 for being applied to the current supplying circuit 32. The counter CT is an n-bit counting logic circuit whose input terminal IN receives the initial voltage establishing signal ES so as to generate n bit signals Q0 to Q(n-1) representative of the number of pulses received. In one embodiment according to the present invention, four of the most significant bit (MSB) signals, Q(n-4) to Q(n-1), are retrieved to generate the first to the eighth current adjusting signals S1 to S8. The first current adjusting signal S1 is generated by the fourth MSB signal Q(n-4) through the inverters K5 and K6, while the second current adjusting signal S2 is generated by the fourth MSB signal Q(n-4) through the inverter K5. Therefore, the first and the second current adjusting signals S1 and S2 are 180 degrees out of phase with respect to each other. The third current adjusting signal S3 is generated by the third MSB signal Q(n-3) through the inverters K7 and K8, while the fourth current adjusting signal S4 is generated by the third MSB signal Q(n-3) through the inverter K7. Therefore, the third and the fourth current adjusting signals S3 and S4 are 180 degrees out of phase with respect to each other. The fifth current adjusting signal S5 is generated by the second MSB signal Q(n-2) through the inverters K9 and K10, while the sixth current adjusting signal S6 is generated by the second MSB signal Q(n-2) through the inverter K9. Therefore, the fifth and the sixth current adjusting signals S5 and S6 are 180 degrees out of phase with respect to each other. The seventh current adjusting signal S7 is generated by the first MSB signal Q(n-1) through the inverters K11 and K12, while the eighth current adjusting signal S8 is generated by the first MSB signal Q(n-1) through the inverter K11. Therefore, the seventh and the eighth current adjusting signals S7 and S8 are 180 degrees out of phase with respect to each other.

The current supplying circuit 32 primarily has seven current sources $I_0$ to $I_6$. The current source $I_0$ is constantly applied to a charging transistor $P_{chg}$ of the charge/discharge control circuit 33 for serving as part of the charge current $I_{chg}$. The current source $I_5$ is constantly applied through a current mirror formed by transistors N1 and N2 to a discharging transistor $N_{dis}$ of the charge/discharge control circuit 33 for combining the current source $I_6$ together to serve as part of the charge current $I_{chg}$. However, the current sources $I_1$ to $I_4$ are determined to be applied to whether the charging transistor $P_{chg}$ or the discharging transistor $N_{dis}$ on the basis of the selective control of the first to the eighth current adjusting signals S1 to S8.

The first current adjusting signal S1 is applied to the gate electrode of the PMOS transistor P1 and the second current adjusting signal S2 is applied to the gate electrode of the PMOS transistor P2. The current source $I_1$ serves as part of the charge current $I_{chg}$ if the transistor P1 is turned ON; otherwise, the current source $I_1$ serves as part of the discharge current $I_{dis}$ if the transistor P2 is turned ON. The third current adjusting signal S3 is applied to the gate electrode of the PMOS transistor P3 and the fourth current adjusting signal S4 is applied to the gate electrode of the PMOS transistor P4. The current source $I_2$ serves as part of the charge current $I_{chg}$ if the transistor P3 is turned ON; otherwise, the current source $I_2$ serves as part of the discharge current $I_{dis}$ if the transistor P4 is turned ON. The fifth current adjusting signal S5 is applied to the gate electrode of the PMOS transistor P5 and the sixth current adjusting signal S6 is applied to the gate electrode of the PMOS transistor P6. The current source $I_3$ serves as part of the charge current $I_{chg}$ if the transistor P5 is turned ON; otherwise, the current source $I_3$ serves as part of the discharge current $I_{dis}$ if the transistor P6 is turned ON. The seventh current adjusting signal S7 is applied to the gate electrode of the PMOS transistor P7 and the eighth current adjusting signal S8 is applied to the gate electrode of the PMOS transistor P8. The current source $I_4$ serves as part of the charge current $I_{chg}$ if the transistor P7 is turned ON; otherwise, the current source $I_4$ serves as part of the discharge current $I_{dis}$ if the transistor P8 is turned ON.

Figure 4:
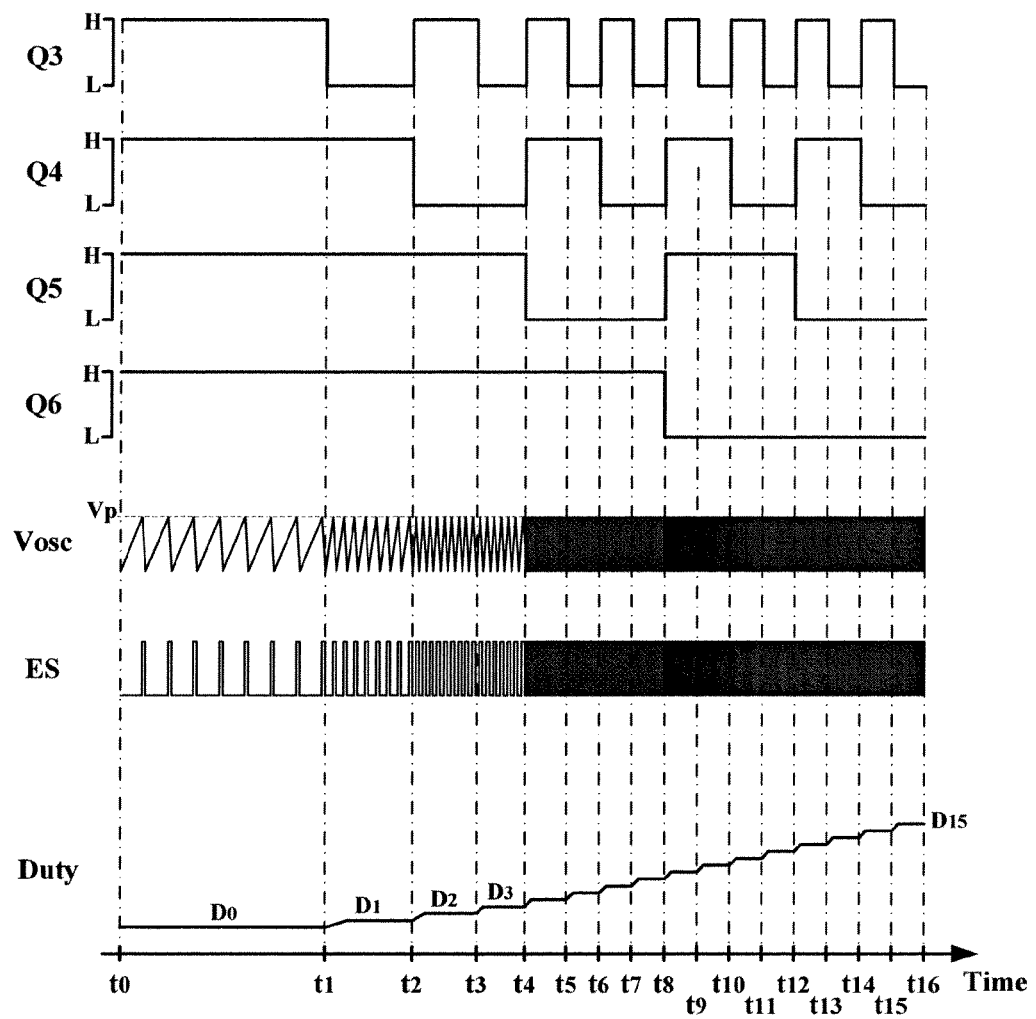
FIG. 4 is a waveform timing chart showing an operation of an initial voltage establishing circuit according to the present invention.

Hereinafter is described in detail the operation of the initial voltage establishing circuit 18 according to the present invention with reference to FIGS. 3 and 4. In the embodiment of FIG. 4, the n-bit counter CT is implemented by a seven-bit counter to generate seven output signals Q0 to Q6 representative of the seven bits from the least to the most. The output signal Q6 represents the first MSB for generating the seventh and the eighth current adjusting signals S7 and S8. The output signal Q5 represents the second MSB for generating the fifth and the sixth current adjusting signals S5 and S6. The output signal Q4 represents the third MSB for generating the third and the fourth current adjusting signals S3 and S4. The output signal Q3 represents the fourth MSB for generating the first and the second current adjusting signals S1 and S2.

At the beginning of activating the initial voltage establishing circuit 18, the clear terminal CLR of the seven-bit counter CT is triggered such that initial states of the seven output signals Q0 to Q6 are all set at the high level H. Therefore, the first, the third, the fifth, and the seventh current adjusting signals S1, S3, S5, and S7 are all at the high level H, while the second, the fourth, the sixth, and the eighth current adjusting signals S2, S4, S6, and S8 are all at the low level L. As a result, the transistors P1, P3, P5, and P7 are all turned OFF, while the transistors P2, P4, P6, and P8 are all turned ON. In this case, the charge current $I_{chg}$ is equal to $I_0$, and the discharge current $I_{dis}$ is equal to $(I_1+I_2+I_3+I_4+I_5+I_6)$. The low level L of the initial voltage establishing signal ES turns ON the charging transistor $P_{chg}$ for allowing the charge current $I_{chg}$ to be applied to the oscillating signal generating circuit 34, causing the oscillating voltage $V_{osc}$ across the oscillating capacitor $C_{osc}$ to continuously increase. After the inverter K1 is triggered by the peak voltage $V_p$ of the oscillating voltage $V_{osc}$, the initial voltage establishing signal ES transitions to the high level H such that the discharging transistor $N_{dis}$ is turned ON for allowing the oscillating signal generating circuit 34 to continuously reduce the oscillating voltage $V_{osc}$ across the oscillating capacitor $C_{osc}$ through the discharge current $I_{dis}$. Therefore, during time $t_0$ to $t_1$ of FIG. 4, the duty cycle $D_0$ is equal to $(I_0/I_{total})$ wherein $I_{total}=(I_{chg}+I_{dis})=(I_0+I_1+I_2+I_3+I_4+I_5+I_6)$.

As soon as the seven-bit counter CT receives the eighth pulse of the initial voltage establishing signal ES, the output signal [Q3, Q4, Q5, Q6] immediately changes to [L, H, H, H].

The low level L of the output signal Q3 turns ON the transistor P1 and turns OFF the transistor P2. As a result, the charge current $I_{chg}$ increases to become $(I_0+I_1)$ and the discharge current $I_{dis}$ decreases to become $(I_2+I_3+I_4+I_5+I_6)$. Therefore, during time $t_1$ to $t_2$ of FIG. 4, the duty cycle $D_1$ is equal to $[(I_0+I_1)/I_{total}]$, which is slightly larger than $D_0$.

Subsequently, as soon as the seven-bit counter CT receives the sixteenth pulse of the initial voltage establishing signal ES, the output signal [Q3, Q4, Q5, Q6] immediately changes to [H, L, H, H]. The low level L of the output signal Q4 turns ON the transistor P3 and turns OFF the transistor P4. As a result, the charge current $I_{chg}$ increases to become $(I_0+I_2)$ and the discharge current $I_{dis}$ decreases to become $(I_1+I_3+I_4+I_5+I_6)$. Therefore, during time $t_2$ to $t_3$ of FIG. 4, the duty cycle $D_2$ is equal to $[(I_0+I_2)/I_{total}]$, which is slightly larger than $D_1$.

Subsequently, as soon as the seven-bit counter CT receives the twenty-fourth pulse of the initial voltage establishing signal ES, the output signal [Q3, Q4, Q5, Q6] immediately changes to [L, L, H, H]. As a result, the charge current $I_{chg}$ increases to become $(I_0+I_1+I_2)$ and the discharge current $I_{dis}$ decreases to become $(I_3+I_4+I_5+I_6)$. Therefore, during time $t_4$ to $t_5$ of FIG. 4, the duty cycle $D_3$ is equal to $[(I_0+I_1+I_2)/I_{total}]$, which is slightly larger than $D_2$.

Following the operational principle described above, the charge current $I_{chg}$ gradually increases and the discharge current $I_{dis}$ gradually decreases, thereby achieving the increase of the duty cycle, . . . $<D_3<D_4<D_5<D_6<$. . . . Finally, during time $t_{15}$ and $t_{16}$ of FIG. 4, the output signal [Q3, Q4, Q5, Q6] immediately changes to [L, L, L, L]. As a result, the charge current $I_{chg}$ increases to become $(I_0+I_1+I_2+I_3+I_4)$ and the discharge current $I_{dis}$ decreases to become $(I_{5+I6})$. Therefore, the duty cycle $D_{15}$ is equal to $[(I_0+I_1+I_2+I_3+I_4)/I_{total}]$.

In the above-mentioned embodiment, it may be assumed that the current source $I_0$ is used as a reference current such that the current source $I_1$ is set equal to the current source $I_0$; the current source $I_2$ is set equal to twice as much as the current source $I_0$; the current source $I_3$ is set equal to four times as much as the current source $I_0$; the current source $I_4$ is set equal to eight times as much as the current source $I_0$; the current source $I_5$ is set equal to four times as much as the current source $I_0$; and the current source $I_6$ is set equal to four times as much as the current source $I_0$. Under such assumptive conditions, during time $t_i$ to $t_{(i+1)}$, the charge current $I_{chg(i)}=(1+i)*I_0$ and the discharge current $I_{dis(i)}=(23-i)*I_0$, wherein i is an integer from 0 to 15. Therefore, the period of the pulse $T_{ES(i)}=C_{osc}*V_p*[(1/I_{chg(i)})+(1/I_{dis(i)})]$, and the duty cycle $D_i=I_{chg(i)}/(I_{chg(i)}+I_{dis(i)})=(1+i)/24$.

Therefore, the initial voltage establishing signal ES provides a tiny duty cycle at the beginning of activation, and then the duty cycle gradually increases such that the output voltage $V_{out}$ at the output terminal O gradually rises from zero potential to the predetermined initial output voltage. Since the initial voltage establishing signal ES provides a tiny duty cycle at the beginning of activation, the huge inrush current is effectively avoided. Since the output voltage $V_{out}$ at the output terminal O has been raised up to the predetermined initial output voltage, the duty cycle of the switch control signal CS output from the switch control circuit 11 is prevented from being expanded to the maximum. Therefore, it is effective to protect the circuit from being damaged by the huge inrush current.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. An initial voltage establishing circuit, applied in a switching voltage converter for converting an input voltage into an output voltage, comprising:
   a current supplying circuit for providing a charge current and a discharge current;
   a current adjusting circuit for adjusting the charge current and the discharge current;
   a charge/discharge control circuit for selectively allowing the charge current and the discharge current to flow through; and
   an oscillating signal generating circuit for employing the charge current and the discharge current to generate an initial voltage establishing signal such that a duty cycle of the initial voltage establishing signal gradually increases, wherein the initial voltage establishing signal is applied to the switching voltage converter so as to establish an initial output voltage, the initial voltage establishing signal is coupled to the current adjusting circuit, and the current adjusting circuit causes the charge current to gradually increase and the discharge current to gradually decrease.

2. The circuit according to claim 1, wherein:
   the current adjusting circuit has a counter for counting a number of pulses of the initial voltage establishing signal such that the current adjusting circuit adjusts the charge current and the discharge current on a basis of the number of pulses.

3. A switching voltage converter for converting an input voltage into an output voltage, comprising:
   a switching circuit having a first switch, a second switch, and an inductor, wherein the first switch, the second switch, and the inductor are coupled together to a switch node;
   an initial voltage establishing circuit for generating an initial voltage establishing signal having a duty cycle which gradually increases, wherein the duty cycle is determined on the basis of a number of pulses of the initial voltage establishing signal;
   a switch control circuit for generating a switch control signal in response to the output voltage; and
   a signal selecting circuit, at the beginning of activating the switching voltage converter, for allowing the initial voltage establishing signal to be applied to the switching circuit to control the first switch and the second switch such that the output voltage rises up to a predetermined initial output voltage, and after the output voltage rises up to the predetermined initial output voltage, for allowing the switch control signal to be applied to the switching circuit to control the first switch and the second switch such that the output voltage is regulated at a target value.

4. The switching voltage converter according to claim 3, wherein:
   the initial voltage establishing circuit includes:
      a current supplying circuit for providing a charge current and a discharge current;
      a current adjusting circuit for adjusting the charge current and the discharge current;
      a charge/discharge control circuit for selectively allowing the charge current and the discharge current to flow through; and
      an oscillating signal generating circuit for employing the charge current and the discharge current to generate an initial voltage establishing signal such that a duty cycle of the initial voltage establishing signal gradually increases, wherein the initial voltage establishing signal is applied to the switching voltage converter so as to establish an initial output voltage.

5. The switching voltage converter according to claim 4, wherein:
   the current adjusting circuit adjusts the charge current and the discharge current on a basis of the initial voltage establishing signal, causing the charge current to gradually increase and the discharge current to gradually decrease.

6. The switching voltage converter according to claim 4, wherein:
   the oscillating signal generating circuit includes:
      an oscillating capacitor across which an oscillating voltage is provided such that the oscillating voltage gradually increases when the charge current is applied to charge the oscillating capacitor, and the oscillating voltage gradually decreases when the oscillating capacitor is discharged through the discharge current, and
      an inverter for generating the initial voltage establishing signal in response to the oscillating voltage.

* * * * *